Jan. 2, 1951     R. GUYER     2,536,639
POULTRY TRAY
Filed Nov. 29, 1946
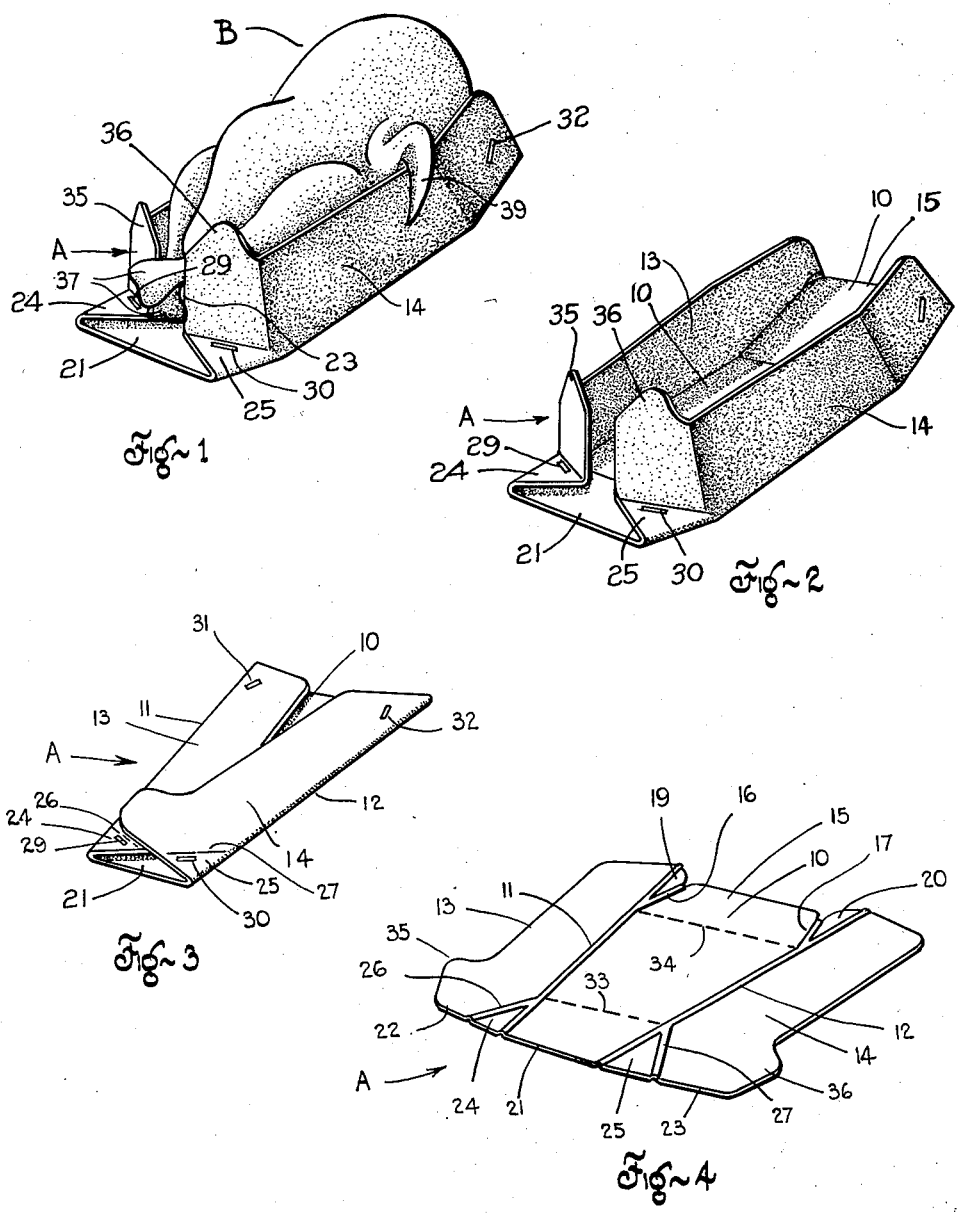
Inventor
Reynolds Guyer
By Robert M. Dunning
Attorney Patented Jan. 2, 1951

2,536,639

UNITED STATES PATENT OFFICE 2,536,639

POULTRY TRAY

Reynolds Guyer, St. Paul, Minn., assignor to Waldorf Paper Products Company, St. Paul, Minn., a corporation of Minnesota Application November 29, 1946, Serial No. 712,892

8 Claims. (Cl. 206—44)

My invention relates to an improvement in poultry trays wherein it is desired to provide a means of supporting a turkey, chicken, or the like, for display purposes.

During recent years, display refrigerators have become increasingly popular. Within these refrigerators various food products have been contained including meats of various sorts and poultry. Because of the shape of the body of a turkey, chicken or the like, it is somewhat difficult to support the same so that they will be properly displayed. Furthermore, because of the uneven shape thereof, it has been somewhat difficult to wrap poultry in cellophane or the like for display purposes.

It is an object of the present invention to provide a tray formed of cardboard or similar material which will support a chicken, turkey or the like and hold the same breast uppermost in display position. This tray provides a firm support for the poultry so that the bird may be readily handled and holds the bird out of contact with the refrigerator shelves. Furthermore the tray provides a rigid surface over which cellophane or similar material may be wrapped if desired to enhance the appearance of the bird and to protect the same.

A feature of the present invention resides in the provision of a tray which is stitched or otherwise fastened in a flat condition and which may be folded to provide a tray bottom and two opposed tray sides. The ends of the bottom between the sides incline upwardly to some extent to fit the curvature of the bird when supported in display position.

A feature of the present invention resides in the provision of a tray including a bottom and a pair of opposed sides and in attaching the tray sides to the tray bottom in such a way that the sides have a tendency to fold inwardly. As a result the sides of the tray lie against the sides of the bird supported and are held in this position.

A further feature of the present invention resides in the provision of a poultry tray which encloses the bottom and sides of a dressed bird and which includes a pair of end flaps between which the legs of the bird may extend. The sides of the tray have a tendency to fold inwardly and as a result the flaps engage against the legs of the bird in such a manner as to hold the legs in proper relation.

A further feature of the present invention resides in the provision of a tray which may be stitched in flat condition and shipped or stored in this flat condition. When it is desired to use the tray, it is only necessary to fold the sides thereof upwardly and to place the bird in the tray in a manner to hold the tray sides apart.

These and other objects and novel features of my invention will be more clearly and fully set forth in the following specification and claims.

In the drawings forming a part of my specification:

Figure 1 is a perspective view of my poultry tray with a bird in position therein.

Figure 2 is a perspective view of the tray in opened position.

Figure 3 is a perspective view of the tray in flat condition.

Figure 4 is a diagrammatic view of the blank from which the tray is formed.

The tray is formed of a blank shaped as best illustrated in Figure 4 of the drawings. The tray A includes a bottom panel 10 which is connected along diverging fold lines 11 and 12 to the opposed side wall panels 13 and 14, respectively. The wider end 15 of the bottom panel 10 is connected by short converging fold lines 16 and 17 to generally triangular connecting portions 19 and 20. The fold lines 16 and 17 extend from the wider edge of the panel 10 in an outwardly diverging direction until they meet the previously described fold lines 11 and 12. The area between the fold lines 11 and 16 and bounded by a portion of the edge of the sheet is designated by the numeral 19, while a similar area bounded by the fold lines 12 and 17 and a portion of the sheet edge is designated by the numeral 20.

The narrow edge 21 of the bottom panel 10 is in substantial alignment with the ends 22 and 23 of the side wall panels 13 and 14 respectively. Triangular areas 24 and 25 are provided between the narrow end portion of the bottom panel and the side walls 13 and 14 respectively. The triangular area 24 is defined by a portion of the fold line 11, a short diverging fold line 26, and the edge of the sheet. The triangular area 25 is defined by a portion of the fold line 12, a short diverging fold line 27, and an edge of the sheet. These triangular areas are provided to bend the ends of the bottom panel upwardly when the side wall panels 13 and 14 are folded upwardly as will be later described in detail.

In forming the tray from the blank illustrated in Figure 4, the blank is folded along the fold lines 11 and 12 so that the side wall panel 13 overlies the base panel 10 and the side wall 14 also overlies the base panel 10 and a portion of the side wall 13. Obviously as both of the side walls 13 and 14 are similar in shape, either of these walls can overlie the other. With the side walls folded to overlie the base panel 10, one or more stitches or staples 29 is inserted through the triangular area 24 near the fold line 26. Similarly one or more staples or stitches 30 is inserted through the triangular area 25 near the fold line 27. The stitches and staples extend through the triangular portions 24 and 25 and the base panel 10 near the narrow edge 21 thereof.

One or more staples or stitches 31 is inserted through the wall panel 13 and through the triangular portion 19 adjacent the fold line 16. Similarly one or more stitches or staples 32 is inserted through the side wall 14 and through the triangular area 20 near the fold line 17. Thus the triangular areas 24 and 25 are secured flat against the bottom panel 10 and must remain in parallel relation thereto while the triangular portions 19 and 20 are stitched in parallel relation to the side walls 13 and 14 respectively, and must remain in this parallel relation.

When the side walls 13 and 14 of the tray A are folded upwardly into substantially vertical position as indicated in Figure 2 of the drawings the divergence of the fold lines 26 and 27 cause the area of the bottom panel 10 adjacent the narrow forward edge of this panel to fold upwardly as indicated in Figure 2. In other words, the portion of the panel forwardly of the broken line 33 connecting the fold lines 11 and 12 at the juncture of the fold lines 26 and 27 therewith will be bent upwardly as shown. Similarly as the side walls 13 and 14 fold upwardly the triangular areas 19 and 20 fold downwardly causing the wider end 15 of the bottom panel to fold upwardly. In other words, the area of the bottom panel forwardly of the broken line 34 extending between the juncture of the fold lines 11 and 16 and the fold lines 17 and 12 bends upwardly as the side walls fold upwardly.

From the foregoing description it will be obvious that the tray is folded when in a flat condition and is stitched in such a manner that when the side walls fold upwardly the ends of the bottom panel also bend upwardly. The intermediate portion of the tray is accordingly lower than the ends thereof so that any moisture collecting in the tray will be held therein. Furthermore as the ends of the bottom panel flex upwardly they curve to fit the shape of the bird supported between the side walls. The upward flexing of the bottom panel ends also tends to urge the side walls inwardly, the bottom panel attempting to fold back into its normal flat condition. Thus the side walls 13 and 14 tend to fold inwardly against the sides of the bird, thus holding the bird properly in display position.

In preferred form the side walls 13 and 14 are provided with integral tabs or projections 35 and 36 which extend upwardly at the narrow end of the tray. These tabs are folded inwardly toward one another by the anchoring of the triangular portions 24 and 25 to the base panel. The legs 37 of the bird B extend between these tabs 35 and 37 when the bird is contained in the tray, these tabs thus acting to hold the bird in proper position. The wings 39 of the tray may extend over the side walls 13 and 14 as illustrated in Figure 1 or may be contained between the walls depending upon the size of the bird.

I have found that the tray will fit birds of various sizes within a considerable wide range. A tray designed for a turkey will be suitable for containing turkeys of a relatively wide variation in weights. Similarly a smaller tray made for a chicken will properly display chickens of varying weights. If desired the bird may be wrapped in a transparent wrapping such as cellophane, the cellophane being anchored if desired to the bottom of the tray or to the sides thereof. The rigid tray provides a firm base for this wrapping.

In accordance with the patent statutes, I have described the principles of construction and operation of my poultry tray and while I have endeavored to set forth the best embodiment thereof, I desire to have it understood that this is only illustrative thereof and that obvious changes may be made within the scope of the following claims without departing from the spirit of my invention.

I claim:

1. A poultry tray comprising a center panel and a pair of side panels connected along substantially straight fold lines, a triangular area formed in each of said side panels at one end thereof and being defined by a portion of one end of said straight fold lines and a pair of outwardly diverging fold lines, said side panels being folded to overlie said center panel, and means connecting said triangular areas to the portions of the center panel which they overlie, said side panels folding inwardly at the ends adjacent to said triangular areas when said side panels are folded upwardly from said center panel and also bending the connected end of said center panel upwardly out of the plane of the remainder of the center panel.

2. The structure described in claim 1 and including a score line extending between the straight fold lines at the juncture between these straight fold lines and the outwardly diverging fold lines.

3. The structure described in claim 1 in which said straight fold lines converge toward one another so that the end of said center panel secured to said triangular areas is narrower than the other end thereof.

4. A poultry tray including a sheet of paper board having a pair of straight score lines extending from end to end thereof, dividing the sheet into the center panel and a pair of side panels, a triangular area at one end of each of said side panels defined by a portion of said straight fold lines, a pair of diverging fold lines at an acute angle to said straight fold lines and an end of the sheet, a second pair of triangular areas at the opposite end of the straight fold lines and inwardly thereof, said triangular areas being defined by a portion of the ends of the straight fold lines, a pair of inwardly converging fold lines, and a portion of the other end of the sheet, means securing said first named triangular areas flat against the center panel, and means securing the last described pair of triangular areas flat against the side panels, said triangular areas acting to bend upwardly the ends of the center panel when said side walls are folded upwardly from said center panel.

5. The structure described in claim 4 in which the triangular areas at opposite ends of the sheet act to incline inwardly the ends of the side panels when the side panels are erected with respect to the center panel.

6. The construction described in claim 4 and in which the center panel is provided with a pair of substantially parallel fold lines connecting said straight fold lines at the juncture between said straight fold lines and said diverging and converging fold lines.

7. A poultry tray including a sheet of paper board having a pair of diverging straight fold lines extending from end to end thereof, a pair of converging fold lines at an acute angle to said diverging fold lines, and forming triangular areas between the diverging fold lines and the converging fold lines at one end of the blank, a pair of diverging fold lines outwardly of the first named diverging fold lines and diverging in the opposite direction, said diverging fold lines forming triangular areas between these diverging fold lines and the other end of the blank, means securing the first named triangular areas flat against the portions of the sheet outwardly of said straight diverging fold lines, and means securing the last named triangular areas between the two pairs of diverging fold lines flat against the portion of the sheet between said straight fold lines.

8. The construction described in claim 7 and including a pair of parallel fold lines connecting said straight fold lines at the juncture between said straight fold lines and the converging fold lines and the second named diverging fold lines.

REYNOLDS GUYER.

REFERENCES CITED

The following references are of record in the file of this patent:

UNITED STATES PATENTS

| Number | Name | Date |
|---|---|---|
| 661,071 | O'Meara | Nov. 6, 1900 |
| 1,027,719 | Fordon et al. | May 28, 1912 |
| 1,032,645 | Beers | July 16, 1912 |
| 1,892,756 | Van Horne | Jan. 3, 1933 |
| 1,987,491 | Nejelski | Jan. 8, 1935 |
| 2,343,563 | McCabe | Mar. 7, 1944 |

FOREIGN PATENTS

| Number | Country | Date |
|---|---|---|
| 428,076 | Germany | Apr. 26, 1926 |